US010214425B2

(12) United States Patent
Nagata et al.

(10) Patent No.: US 10,214,425 B2
(45) Date of Patent: Feb. 26, 2019

(54) METHOD FOR PRODUCING SILICON USING MICROWAVE, AND MICROWAVE REDUCTION FURNACE

(71) Applicants: Kazuhiro Nagata, Yokohama (JP); SHIMIZU DENSETSU KOGYO Co., LTD., Amagasaki-shi (JP)

(72) Inventors: Kazuhiro Nagata, Yokohama (JP); Miyuki Kanazawa, Tokyo (JP)

(73) Assignees: KAZUHIRO NAGATA, Yokohama-Shi, Kanagawa (JP); SHIMIZU DENSETSU KOGYO CO., LTD., Amagasaki-Shi, Hyogo (JP)

( * ) Notice: Subject to any disclaimer, the term of this patent is extended or adjusted under 35 U.S.C. 154(b) by 96 days.

(21) Appl. No.: 15/356,065

(22) Filed: Nov. 18, 2016

(65) Prior Publication Data

US 2017/0101318 A1    Apr. 13, 2017

Related U.S. Application Data

(62) Division of application No. 13/934,136, filed on Jul. 2, 2013, now Pat. No. 9,550,681.

(30) Foreign Application Priority Data

Jul. 11, 2012 (JP) .................................. 2012-155995

(51) Int. Cl.
*C01B 33/025* (2006.01)
*F27B 5/14* (2006.01)
(Continued)

(52) U.S. Cl.
CPC .......... *C01B 33/025* (2013.01); *B01J 19/126* (2013.01); *C01B 33/113* (2013.01); *F27B 3/08* (2013.01);
(Continued)

(58) Field of Classification Search
None
See application file for complete search history.

(56) References Cited

U.S. PATENT DOCUMENTS

| 6,712,902 B2 | 3/2004 | Geho |
| 2009/0039572 A1* | 2/2009 | Nagata ................... C21B 13/12 266/161 |

(Continued)

FOREIGN PATENT DOCUMENTS

| CN | 102171142 A | 8/2011 |
| JP | H 10-273311 A | 10/1998 |

(Continued)

OTHER PUBLICATIONS

Sato et al. "Conceptual Design of Microwave Applicators with Phase Array Antennas for Industries" The Fifth Symposium on Japan Society of Electromagnetic Wave Energy Applications, Proceeding 2B07, 2011, pp. 98-99.*

(Continued)

*Primary Examiner* — Kishor Mayekar
(74) *Attorney, Agent, or Firm* — McGinn I.P. Law Group, PLLC

(57) ABSTRACT

A microwave reduction furnace including a reaction furnace provided with a refractory chamber of silica or silicon carbide for storing a material therein, a supply section for supplying the material into the refractory chamber, the material being a mixture of a silica powder and a graphite powder or a mixture of a silica powder, a silicon carbide powder and a graphite powder, a discharge section for discharging molten silicon, obtained through reduction, out of the chamber, and a microwave oscillator for outputting microwave toward the refractory chamber in the reaction furnace with a degree of directionality by virtue of a helical antenna or a waveguide.

17 Claims, 5 Drawing Sheets

(51) Int. Cl.
*F27B 3/08* (2006.01)
*F27B 5/04* (2006.01)
*C01B 33/113* (2006.01)
*B01J 19/12* (2006.01)
*F27D 99/00* (2010.01)

(52) U.S. Cl.
CPC ............... *F27B 5/04* (2013.01); *F27B 5/14* (2013.01); *F27D 99/0006* (2013.01); *B01J 2219/0879* (2013.01); *B01J 2219/12* (2013.01); *B01J 2219/123* (2013.01); *B01J 2219/1215* (2013.01); *B01J 2219/1233* (2013.01); *B01J 2219/1239* (2013.01); *B01J 2219/1242* (2013.01); *B01J 2219/1248* (2013.01); *B01J 2219/1266* (2013.01); *B01J 2219/1269* (2013.01); *B01J 2219/1296* (2013.01); *F27D 2099/0028* (2013.01)

(56) References Cited

U.S. PATENT DOCUMENTS

| | | |
|---|---|---|
| 2010/0284887 A1 | 11/2010 | Mai |
| 2011/0243826 A1 | 10/2011 | Tomita |
| 2011/0262336 A1 | 10/2011 | Rauleder et al. |
| 2017/0165631 A1* | 6/2017 | Takatani ............... B01J 19/126 |

FOREIGN PATENT DOCUMENTS

| | | | |
|---|---|---|---|
| JP | | 2003-55096 A | 2/2003 |
| JP | | 2011-500495 A | 1/2011 |
| JP | | 2013-011384 * | 1/2013 |
| WO | WO 2009/060264 A1 | | 4/2009 |
| WO | WO 2010/037694 A2 | | 4/2010 |

OTHER PUBLICATIONS

Horikoshi, "Production of bulky silicon by microwave heating" Summary of 150th Japan Metallurgy Symposium, dated Mar. 15, 2012.

Japanese Office Action dated Sep. 18, 2012, with partial English translation.

Chinese Office Action dated Dec. 29, 2014 and Japanese translation of the Chinese Office Action, with a partial English translation thereof.

Extended European Search Report dated Jul. 8, 2016 in European Application No. 13175719.7.

United States Notice of Allowance dated Sep. 22, 2016, in U.S. Appl. No. 13/934,136.

U.S. Non-Final Office Action dated Aug. 18, 2015, in U.S. Appl. No. 13/934,136.

U.S. Non-Final Office Action dated May 25, 2016, in U.S. Appl. No. 13/934,136.

U.S. Final Office Action dated Jan. 20, 2016, in U.S. Appl. No. 13/934,136.

* cited by examiner

METHOD FOR PRODUCING SILICON USING MICROWAVE, AND MICROWAVE REDUCTION FURNACE

CROSS-REFERENCE TO RELATED APPLICATIONS

The present application is a Divisional application of U.S. patent application Ser. No. 13/934,136, filed on Jul. 2, 2013, which is based on Japanese Patent Application No. 2012-155995 filed on Jul. 11, 2012, the entire contents of which are hereby incorporated by reference.

TECHNICAL FIELD

The present invention relates to a method for producing silicon from silica ore and a microwave reduction furnace for use therewith, and more specifically to a method for producing silicon using microwave and a microwave reduction furnace, wherein a mixture of silica (silica ore) and silicon carbide is used as the material.

BACKGROUND ART

High-purity silicon is used in semiconductor substrates and solar cells. As a method for producing such high-purity silicon, silica is melted in an arc furnace to obtain impurity-rich coarse silicon, after which the coarse silicon is hydrogenated into a silane ($SiHCl_3$) gas, which is silicon is hydrogenated into a silane ($SiHCl_3$) gas, which is reduced with hydrogen to obtain high-purity silicon. A problem with this conventional method is that the process is complicated, failing to allow for quick production of high-purity silicon. In order to melt silica by an arc furnace, it is necessary to heat the material to 3000° C. by arcing, thereby requiring a high input energy for heating, resulting in a high production cost.

On the other hand, another method has been proposed in the art, in which a carbon source is used to reduce silicon oxide which has been purified through acid precipitation from an aqueous solution of silicon oxide dissolved in aqueous phase with an acidifying agent, thereby obtaining solar grade silicon, as described in Patent Document No. 1 (claim 1 of Patent Document No. 1). Patent Document No. 1 discloses that this reduction of purified silicon oxide into silicon is done in an arc furnace, a thermal reactor, an induction furnace, a rotary kiln and/or a microwave heating furnace (claim 7 of Patent Document No. 1).

Patent Document No. 2 discloses a method for producing silicon from silicon oxide through thermal reduction in a microwave oven. This conventional technique is a method in which silicon oxide is used as a starting material, and the obtained silicon is additionally subjected to a zone melting method in a microwave oven.

Patent Document No. 1: Japanese National Phase PCT Laid-Open Publication No. 2012-504100

Patent Document No. 2: Japanese National Phase PCT Laid-Open Publication No. 2011-500495

SUMMARY OF INVENTION

Technical Problem

However, the conventional techniques described in Patent Document Nos. 1 and 2 have a problem in that the efficiency of reduction reaction of silica into silicon is low, and the reduction reaction requires a long period of time, making it difficult to quickly produce high-purity silicon. Particularly, where the material is heated using an electric furnace, the material is heated with radiation heat, thereby resulting in a low heating efficiency, requiring a high input energy, and resulting in a high production cost. Moreover, since an electric furnace cannot be closed airtight, an SiO gas, which is an intermediate product, dissipates, thereby lowering the yield of silicon. Although Patent Document Nos. 1 and 2 describe heating using microwave, no further disclosure is provided, failing to disclose a specific method for reducing silica using microwave.

The present invention has been made in view of such problems, and it is an object thereof to provide a method for producing silicon using microwave and a microwave reduction furnace, with which it is possible to quickly reduce silica to quickly produce silicon.

Solution to Problem

A method for producing silicon using microwave according to the present invention includes the steps of:

supplying a material of a mixture of a silica powder and a graphite powder or a mixture of a silica powder, a silicon carbide powder and a graphite powder into a refractory chamber of silica or silicon carbide;

irradiating the material in the chamber with microwave so that the graphite powder absorbs a microwave energy to increase a temperature, and a reduction reaction is allowed to occur between the silica and the silicon carbide and/or the graphite after the temperature is increased, thereby producing molten silicon; and discharging molten silicon out of the chamber.

In this method for producing silicon using microwave, the reduction reaction into silicon may be allowed to proceed in an argon gas, a nitrogen gas or a helium gas, for example.

A microwave reduction furnace according to the present invention includes:

a reaction furnace provided with a refractory chamber of silica or silicon carbide for storing a material therein;

a supply section for supplying the material into the refractory chamber, the material being a mixture of a silica powder and a graphite powder or a mixture of a silica powder, a silicon carbide powder and a graphite powder;

a discharge section for discharging molten silicon, obtained through reduction, out of the chamber; and a microwave oscillator for outputting microwave toward the refractory chamber in the reaction furnace with a degree of directionality by virtue of a helical antenna or a waveguide.

Another microwave reduction furnace according to the present invention includes:

a reaction furnace provided with a refractory chamber of silica or silicon carbide for storing a material therein;

a supply section for supplying the material into the chamber, the material being a mixture of a silica powder and a graphite powder or a mixture of a silica powder, a silicon carbide powder and a graphite powder;

a discharge section for discharging molten silicon, obtained through reduction, out of the chamber;

a microwave unit arranged on an inner surface of a circumferential surface surrounding the refractory chamber for radiating a microwave beam toward a particular point in the refractory chamber; and a main reflection mirror arranged above the refractory chamber, the main reflection mirror having a paraboloid whose focal point coincides with the particular point and which paraboloid serves as a reflection surface for microwave.

Advantageous Effects of Invention

According to the present invention, as the material (a mixture of a silica powder and a graphite powder or a mixture of a silica powder, a silicon carbide powder and a graphite powder) is irradiated with microwave, graphite efficiently absorbs the microwave, thereby efficiently heating the mixture material over a low temperature range from normal temperature to about 1000° C., after which the reduction reaction occurs, thus enabling quick production of silicon using microwave.

DESCRIPTION OF EMBODIMENTS

Embodiments of the present invention will now be described in detail. According to a method for producing silicon using microwave of the present invention, a mixture of a silica powder and a graphite powder or a mixture of a silica powder, a silicon carbide powder and a graphite powder is used as a material, and the material is irradiated with microwave to produce molten silicon. When the mixture material is irradiated with microwave, graphite exclusively absorbs microwave to generate heat, thus increasing the temperature of the mixture material over a relatively low temperature range from room temperature to about 1000° C. Graphite efficiently absorbs microwave to heat the mixture material at a high speed. Then, at about 1000° C. or higher, the value of the imaginary part of the dielectric constant of silicon carbide (if included) becomes high, thereby absorbing microwave to generate heat thereby increasing the temperature of the mixture material. While silicon carbide does not substantially absorb microwave at room temperature, the microwave absorptivity thereof improves at about 1000° C. or higher. In the process where graphite and silicon carbide absorb microwave to generate heat, increasing the temperature of the mixture material, graphite and silicon carbide react with silica, thus obtaining molten silicon through reduction. This reduction reaction is represented by a chemical formula below.

(1) First, a case where molten silicon is produced from a mixture of a silica powder, a silicon carbide powder and a graphite powder will be described.

Where the mixture material is a mixture of a silica powder, a silicon carbide powder and a graphite powder, the reduction reaction proceeds as follows. Note that Si is produced at a temperature of 1796° C. or higher, at which silica is liquid and is thus denoted as $SiO_2$ (l). Silicon carbide is solid and is thus denoted as SiC(s), and silicon oxide is gas and is thus denoted as SiO (g). Si(l) denotes molten silicon. CO (g) denotes carbon monoxide gas. Note that (s), (g) and (l) denote a solid, gas and liquid component, respectively. First, where a graphite powder is present, a reaction of Chemical Formula 1 below proceeds exclusively.

$$SiO_2(l)+C(s) \rightarrow SiO(g)+CO(g)$$

$$SiO(g)+2C(s) \rightarrow SiC(s)+CO(g) \quad \text{[Chem. 1]}$$

In this reduction reaction, a reaction of Chemical Formula 2 below occurs, apparently, as shown below.

$$SiO_2(l)+3C(s) \rightarrow SiC(s)+2CO(g) \quad \text{[Chem. 2]}$$

Then, the graphite powder in the mixture material serves as an exothermic agent and a reducing agent as shown in Chemical Formula 2 above. As the graphite powder is mostly consumed through reaction with $SiO_2$, a reaction between $SiO_2$ and SiC begins, and a reaction of Chemical Formula 3 below proceeds.

$$SiO_2(l)+SiC(s) \rightarrow SiO(g)+Si(l)+CO(g)$$

$$SiO(g)SiC(s) \rightarrow 2Si(l) \pm CO(g) \quad \text{[Chem. 3]}$$

In this reduction reaction, a reaction of Chemical Formula 4 occurs, apparently, as shown below.

$$SiO_2(l)+2SiC(s) \rightarrow 3Si(l)+2CO(g) \quad \text{[Chem. 4]}$$

From Chemical Formulas 2 and 4 above, the apparent reaction as a whole is as shown in Chemical Formula 5 below.

$$SiO_2(l)+2C(s) \rightarrow Si(l)+2CO(g) \quad \text{[Chem. 5]}$$

Chemical Formulas 2, 4 and 5 above indicate that the material mixture powder is irradiated with microwave when it is introduced through an upper portion of the furnace, wherein, substantially, a reaction between $SiO_2$ and C occurs first and then a reaction between $SiO_2$ and SiC occurs. As a result, for the reaction as a whole, $SiO_2$ is reduced by C as shown in Chemical Formula 5, if the reaction between $SiO_2$ and C (Chemical Formula 2) and the reaction between $SiO_2$ and SiC (Chemical Formula 4) are occurred under a particular proportion with a particular material mixing condition. In order to generalize this, consider the yield of the reaction product for a material containing m mol of SiC and n mol of C mixed together. Then, since C is present in n mol in Chemical Formula 2, Chemical Formula 2 can be rewritten as follows.

$$(n/3)SiO_2+nC=(n/3)SiC+(2n/3)CO$$

On the other hand, for the reaction of SiC in Chemical Formula 4, since (n/3) mol of SiC produced in Chemical Formula 2 above is present, in addition to m mol of SiC in the material, Chemical Formula 4 can be rewritten as follows.

$$(1/2)(m+(n/3))SiO_2+(m+(n/3))SiC=(3/2)(m+(n/3))Si+(m+(n/3))CO$$

Combining together these variations of Formulas 2 and 4 yields Chemical Formula 6 below.

$$SiO_2(l)+2m/(m+n)SiC(s)+2n/(m+n)C(s) \rightarrow ((3m+n)/(m \pm n))Si(l)+2CO(g) \quad \text{[Chem. 6]}$$

As indicated by Chemical Formula 6, apparently the entire reaction has occurred. Therefore, this means that 2m/(m+n) mol of SiC and 2n/(m+n) mol of C were involved in the reduction of 1 mol of $SiO_2$, producing (3m+n)/(m+n) mol of Si along with 2 mol of CO. Since the total amount of SiC and C for 1 mol of $SiO_2$ is (2m+2n)/(m+n)=2, the total amount of SiC and C is 2 mol for 1 mol of $SiO_2$. Thus, the mixing ratio between material powders can be determined so that $SiO_2$:(SiC+C)=1:2 in molar ratio. The mixing ratio between the SiC powder and the graphite powder is desirably 1:1, and therefore the molar ratio between $SiO_2$, SiC and C is preferably 1:1:1. In this case, the weight ratio between $SiO_2$, SiC and C is $SiO_2$:SiC:C=4:6:1. The graphite powder may be arranged, as if by being sprinkled, on the surface of the mixture powder of $SiO_2$:SiC=1:1 (molar ratio). Note that as is clear from Chemical Formula 6, 0<m<2/3.

(2) Next, a case where molten silicon is produced from a mixture powder of a silica powder and a graphite powder will be described. In this case, the reaction occurs in accordance with Chemical Formula 7 below in an upper portion of the chamber into which the mixture powder is supplied, and the apparent reaction is expressed by Chemical Formula 8 below. Note that graphite is denoted as C(s).

$$SiO_2(l)+C(s)\rightarrow SiO(g)+CO(g)$$

$$SiO(g)+2C(s)\rightarrow SiC(s)+CO(g) \quad [\text{Chem. 7}]$$

$$SiO_2(s)+3C(s)\rightarrow SiC(s)+2CO(g) \quad [\text{Chem. 8}]$$

Thus, while SiC(s), which is not mixed in the material is produced in an upper portion of the chamber through the reaction between $SiO_2$ and C, this SiC moves to a lower portion of the chamber as the molten silicon is discharged through the lower portion of the chamber, and SiC reacts with $SiO_2$ in the lower portion of the chamber in accordance with Chemical Formula 9 below. The apparent reaction is expressed by Chemical Formula 10 below.

$$SiO_2(l)+SiC(s)\rightarrow SiO(g)+Si(l)+CO(g)$$

$$SiO(g)+SiC(s)\rightarrow 2Si(l)+CO(g) \quad [\text{Chem. 9}]$$

$$SiO_2(l)+2SiC(s)\rightarrow 3Si(l)+2CO(g) \quad [\text{Chem. 10}]$$

Combining Chemical Formula 8 and Chemical Formula 10 together so that the SiC terms are canceled out by each other, the reaction as a whole in the chamber is as shown by Chemical Formula 11 below.

$$SiO_2(l)+2C(s)\rightarrow Si(l)+2CO(g) \quad [\text{Chem. 11}]$$

If the mixing ratio between silica and graphite is set to 1:3 in molar ratio and 5:3 in weight ratio, SiC(s) is produced in an upper portion of the chamber, and this SiC(s) reacts with $SiO_2$ (s), remaining in a lower portion of the reaction chamber, thereby producing Si. The mixing ratio between silica and graphite is 1:2 in molar ratio and 5:2 in weight ratio. Note that as the material mixture powder is introduced through the upper portion of the reaction chamber and falls down, the reaction in the upper portion of the chamber and the reaction in the lower portion of the chamber described above occur. Note however that in the upper portion of the chamber, substantially the entire amount of graphite (C) is consumed in the reaction of Chemical Formula 8 as described above, and hardly any C reaches the lower portion of the chamber. While C remains in the upper portion of the chamber, $SiO_2$ continues to react with C to produce SiC and it will not produce Si. Therefore, in the lower portion of the chamber, the reaction of Chemical Formula 10 proceeds exclusively.

While an SiO gas is produced as an intermediate product in this series of reactions as indicated by the chemical formulas above, the SiO gas comes into contact with solid silica ($SiO_2$), graphite (C) and silicon carbide (SiC) to reduce silica through a gas-solid reaction, of which the reaction interface area is large. Therefore, the reduction reaction proceeds at a high speed if a powder material having a large surface area is used. It is important to prevent the SiO gas, which is a reaction product, from escaping out of the refractory chamber. This is because in order for the gas-solid reduction reaction to occur to a sufficient degree, the SiO gas needs to be present around the material mixture. Therefore, the refractory chamber is made of compact silica ($SiO_2$) or silicon carbide (SiC), and the SiO gas, which is a produced gas, is kept in the material mixture powder in the refractory chamber, while a part of the SiO gas that gets mixed in the discharge gas is captured and retrieved by means of a cyclone. Since silica does not absorb microwave, the silica chamber itself will not generate heat, and it is possible to heat only the graphite or silicon carbide contained therein. Where a silicon carbide brick is used, since it does not allow microwave to pass therethrough but reflects microwave, the opening of the upper portion of the chamber is covered by a lid made of silica, or the like, and microwave is output therefrom. The body of a reaction chamber may be formed by black lead (graphite), and the black lead inner surface may be lined with silicon carbide or silicon carbide may be produced on the black lead inner surface so as to obtain a reaction chamber of which the surface to be in contact with the material and molten silicon is formed by silicon carbide and supported by black lead. Note that as indicated by the chemical formulas above, CO and SiO are produced each as a gas. While the SiO gas contributes to the reaction in accordance with the reaction formulas above while it is in the material mixture powder, a part of the SiO gas is discharged, along with the CO gas, into the reaction chamber through the uppermost portion of the material mixture powder, and is passed into a cyclone from a discharge port to be described later, whereby SiO in the discharge gas is retrieved in the cyclone and captured as Si.

A material mixture of silica and graphite, or a material mixture of silica, silicon carbide and graphite, is provided in a powder form and is sufficiently mixed by means of a mill, or the like. By mixing the powder, the solid materials adhere to one another sufficiently, further increasing the speed of the reduction reaction. The particle size of the material powder is preferably 10 to 100 μm, for example.

The atmosphere of reduction reaction is preferably an inert gas atmosphere of an argon gas, a nitrogen gas, a helium gas, or the like. By melting the material mixture powder in an inert gas atmosphere (an argon gas), it is possible to produce high-purity silicon whose nitrogen and oxygen content is very low. This will be the case also when the atmosphere of reduction reaction is a helium gas atmosphere. Also when the reduction reaction is allowed to occur under a nitrogen gas atmosphere, it is possible to produce high-purity molten silicon whose oxygen content is low. Note that other approaches have been used in the prior art to increase the purity of produced silicon because it had been pointed out that under an argon gas atmosphere, microwave would ionize Ar, thereby inducing a plasma. However, the present inventors found a way microwave can be used (without causing ionization) under an argon gas atmosphere, enabling the production of high-purity silicon using microwave.

Thus, according to the present invention, it is possible to reduce silica to obtain molten silicon in a short period of time and continuously.

Next, a microwave reduction furnace for use with the method for producing silicon using microwave of the present invention will be described. FIG. 1 is a vertical-sectional view showing a microwave reduction furnace according to an embodiment of the present invention. A refractory chamber 12 is made of silica or silicon carbide. A molten silicon tapping hole 13 is provided in the vicinity of the boundary between the side surface and the bottom surface of the chamber 12. A material supply port 14 and a discharge gas port 15 are provided in an upper wall 12a of the chamber 12. A reaction furnace 31 including the chamber 12 is arranged inside a spherical furnace body 32 made of stainless steel. The chamber 12 is held in the furnace body 32 by means of a support member (not shown) made of a refractory material.

Provided in the hole 13 is a tapping pipe 16 extending in a downwardly slanted direction from the chamber 12 so as to be communicating with the chamber 12, so that a molten silicon 3 in the chamber 12 can be discharged through the tapping pipe 16. The tapping pipe 16 is a pipe made of silica, and extends through the furnace body 32 to the outside of the furnace, allowing molten silicon to flow into a ladle (not shown) arranged outside the furnace. Heaters 17 and 18, such as resistance heating coils, are provided so as to be fitted around the tapping pipe 16, and the heaters 17 and 18 increase and keep the temperature of the molten silicon flowing through the tapping pipe 16 at about 1500° C., thereby preventing the molten silicon 3 from solidifying inside the tapping pipe 16. The heaters 17 and 18 are arranged so as to be sealed in a chamber made of graphite (not shown), and the graphite chamber is electrically connected to the stainless steel furnace body 32 and grounded. Thus, microwave will not pass through graphite, and the heaters 17 and 18 will not be irradiated with microwave.

The bottom surface of the chamber 12 is mildly curved so as to protrude downwards, and one end of the tapping pipe 16 that is closer to the chamber 12 is positioned slightly above the bottom surface of the chamber 12. Therefore, after a small amount of the molten silicon 3 in the chamber 12 fills the bottom portion of the chamber 12, the molten silicon 3 is discharged out of the chamber 12 through the tapping pipe 16. When silicon solidifies, the volume thereof expands, thereby damaging the reaction chamber 12. Therefore, produced molten silicon needs to be taken out of the reaction chamber 12 while in a molten state. Thus, molten silicon is discharged out of the chamber 12 through the tapping pipe 16 as quickly as possible and continuously, without storing a large amount of molten silicon inside the chamber 12. By forming the bottom surface of the chamber 12 so as to be mildly curved so as to protrude downwards, it is possible to reduce the stress due to the expansion from the solidification of molten silicon.

A weir 19 made of a refractory material is provided on a portion of the tapping hole 13 inside the chamber 12, and the weir 19 restricts the flow of molten silicon into the tapping hole 13. As shown in FIG. 2 of a plan view, the weir 19 has a cutout at a position along the center line of the tapping pipe 16, which cutout serves as a molten silicon outlet 19a, with the remaining portion other than the outlet 19a serving to block the outflow of molten silicon. That is, as seen in FIG. 1 of a side cross-sectional view, the weir 19 extends from the side wall inner surface of the chamber 12 and bends down toward the bottom surface. At at the drooping end of the weir 19, the opposing side portions of the weir 19 beside the outlet 19a are in contact with the bottom surface of the chamber 12 and supported by the bottom surface, with the portion of the weir 19 corresponding to the outlet 19a being positioned so as to be slightly immersed in molten silicon as the molten silicon fills the bottom portion of the chamber 12. Since the upper end of the outlet 19a of the weir 19 is immersed in the molten silicon in the chamber 12 as described above, once the molten silicon starts flowing out through the tapping pipe 16, the molten silicon in the chamber 12 continuously flows out of the chamber 12 by virtue of a siphon action. Moreover, the immersion of the upper end of the outlet 19a of the weir 19 in the molten silicon prevents the gas in the reaction chamber 12 from leaking out through the outlet 19a and the tapping pipe 16. Thus, the gas in the chamber 12 is contained in the chamber 12. This prevents the SiO gas, produced in the chamber 12, from leaking out of the chamber 12. Note that although no part of the tip of the weir 19 may be in contact with the chamber bottom surface, the tip needs to be immersed in the molten silicon.

The furnace body 32 is supported by an appropriate supporting device and provided with a lid 21 that can be opened and closed, and the refractory chamber 12 can be moved in and out of the furnace body 32 by opening the lid 21. The furnace body 32 includes a plurality of cylindrical projecting portions 22 that are positioned generally equidistant from one another, with a microwave oscillator 33 arranged at the end of each projecting portion 22. The microwave oscillators 33 are each provided with a helical antenna 34, and the microwave oscillators 33 are arranged with the directional angles of the antennas slightly shifted from one another so that the directions of the helical antennas 34 will not coincide with each other for any pair of microwave oscillators 33 opposing each other with the center of the furnace body 32 therebetween.

The upper portion of the iron furnace body 32 is partially cut out, and the plate-shaped lid 21 made of iron is placed over the cutout. The iron lid 21 includes water-cooled pipes 23 and 24 made of iron, for example, running through the lid 21 with their axis direction being vertical, and the lower portions of the water-cooled pipes 23 and 24 are inserted through the upper wall 12a of the chamber 12 so as to communicate with the discharge port 15 and the material supply port 14, respectively, of the chamber 12. The upper portion of the water-cooled pipe 23 is connected to a cyclone 27, and when the gas inside the reaction chamber 12 is discharged, the SiO gas mixed in the discharge gas is retrieved while being decomposed into Si and $SiO_2$ in the cyclone 27. After being purified in the cyclone 27, this gas is discharged to the outside as a discharge gas. A branch pipe 25 is connected to an upper portion of the water-cooled pipe 24 so that an inert gas such as an Ar gas, a nitrogen gas or a helium gas is supplied into the chamber 12 through the branch pipe 25 and the water-cooled pipe 24. Moreover, the material (made of a mixture 2 of a silica powder and a graphite powder, or a mixture 2 of a silica powder, a silicon carbide powder and a graphite powder) is introduced into the chamber 12 through the water-cooled pipe 24.

Next, an operation of the microwave reduction furnace configured as described above will be described. An Ar gas, a nitrogen gas or a helium gas is supplied into the reaction chamber 12 through the material supply water-cooled pipe 24 and the branch pipe 25, substituting the atmosphere with the gas. Then, a material mixture powder made of a mixture of a silica powder and a graphite powder or a mixture of a silica powder, a silicon carbide powder and a graphite powder is supplied into the chamber 12 through the material supply water-cooled pipe 24. Then, the microwave oscillators 33 are actuated to output microwave through the antennas 34 into the reaction furnace 31. The material of the reaction chamber 12 is silica, and silica does not absorb microwave. Therefore, the microwave output from each antenna 34 passes through the reaction chamber 12 to irradiate the material mixture powder in the reaction chamber 12. The microwave output from the microwave oscillator 33 into the chamber 12 through the helical antenna 34 is absorbed by the graphite powder of the material mixture powder, and the graphite powder is self-heated, thereby heating the material mixture powder and increasing the temperature thereof. In the present embodiment, the helical antennas 34 are used to irradiate the material mixture powder in the chamber 12 with microwave with a high level of directionality, and it is therefore possible to heat the material mixture powder with a very high energy efficiency.

For example, the frequency of the microwave is 900 MHz to 3 GHz, and the output power thereof is 3 kW or higher, which output power may be varied over time. Microwave radiations of frequencies of 915 MHz and 2.45 GHz are industrially available. As the frequency of the microwave is lower, the value of the imaginary part of the dielectric constant of the graphite powder in the material becomes higher, and the graphite powder then absorbs microwave more efficiently and generates heat more easily. On the other hand, the silicon carbide powder in the material does not substantially absorb microwave at room temperature, but the value of the imaginary part of the dielectric constant thereof becomes high at 1000° C. or higher, and the silicon carbide powder then absorbs microwave and generates heat more easily. Therefore, the graphite powder mixed in the material efficiently absorbs microwave over a relatively low temperature range of room temperature to about 1000° C., and it is mainly this graphite powder that absorbs microwave to generate heat and increase the temperature. Thereafter, at a high temperature of 1000° C. or higher, silica also absorbs microwave to increase the temperature, and there is also heat generated from the reduction reaction, thereby increasing the temperature of the material. Where a silicon carbide powder is contained in the material, in a high temperature range over 1000° C., the microwave absorbing efficiency of the silicon carbide powder increases, and it is then mainly this silicon carbide powder that generates heat to increase the temperature of the material.

The temperature of the material mixture powder 2 increases as described above, and the surface temperature of the material mixture powder 2 reaches about 1800° C., for example. In this case, the microwave input energy is 3 kW or higher. At such a temperature or over the course of such a temperature increase, the reduction reaction represented by Chemical Formulas 1 to 7 above occurs, thereby producing molten silicon.

The produced molten silicon passes through a lower portion of the weir 19, and is discharged out of the reaction chamber 12 through the tapping pipe 16 while being heated to keep the temperature by means of the heaters 17 and 18. Thus, the molten silicon filling the bottom portion of the chamber 12 is continuously discharged out of the chamber without solidifying in the bottom portion of the chamber 12. Thereafter, the mixture powder material is continuously introduced into the reaction chamber 12 from the material supply port 14 while irradiating the material powder with microwave and heating the material powder, thereby allowing the reduction reaction to occur, and the obtained molten silicon is continuously discharged through the tapping pipe 16, thus realizing continuous production of molten silicon.

During the reduction reaction, the discharge gas from the discharge gas port 15 is guided into the cyclone 27, where the SiO gas produced as an intermediate product as shown in Chemical Formulas 1, 3 and 5 is retrieved as Si and $SiO_2$. Therefore, by preventing the escape of the SiO gas, which is an intermediate product, the yield of silicon can be nearly 100%. In this process, the vapor pressure of SiO in an upper portion of the reaction chamber 12 is about 0.007 atm, and the SiO gas accounts for about 0.7% of the discharge gas. On the other hand, the vapor pressure of SiO in a lower portion of the reaction chamber 12 is about 0.7 atm. Thus, the SiO gas produced in a lower portion of the reaction chamber moves to an upper portion of the reaction chamber, where it reacts with graphite to become SiC, thereby decreasing the amount of SiO to be mixed in the discharge gas.

Note that with the conventional process of producing silicon using an arc furnace, a large amount of SiO gas dissipates out of the furnace, significantly lowering the production efficiency. Also with microwave heating, a heating experiment using a crucible made of alumina cement showed that the SiO gas had dissipated over about 30 minutes during the initial temperature increase of the reaction. Then, the experiment, conducted in the air, showed that the SiO gas came into contact with the air to produce an $SiO_2$ film, which covered the upper surface of the reactant in the crucible, protecting the reactant from the ambient air, thus enabling the production of silicon. As a result, the yield of silicon obtained was 22%. The yield of silicon will not be high unless the SiO gas, which is an intermediate product, is allowed to react with graphite to produce the SiC material, as described above. Note however that it was found in this experiment that where molten silicon is produced using microwave in a batch process, it advantageously allows for a reduction reaction in the air.

The reduction atmosphere is in an inert gas such as an Ar gas, an He gas or a nitrogen gas, as will be described later, high-purity silicon can be produced as long as the material is a high-purity material because there is no impurity coming in from the outside.

In the prior art, it was believed that in an Ar gas atmosphere, microwave would ionize the Ar gas, thereby inducing a plasma. Accordingly, it was technical common sense that microwave heating is difficult to use in an Ar gas atmosphere. However, through an experiment in which an Ar gas was supplied around the material powder through the water-cooled iron pipe 24 and the material powder was irradiated with microwave in the Ar gas atmosphere, the present inventors confirmed that a plasma is not induced with an Ar gas if there is a substance, such as a graphite powder, that efficiently absorbs microwave. Therefore, in the present embodiment, silica is preferably reduced by heating the material mixture powder using microwave in an Ar gas atmosphere. Thus, by melting the material mixture powder in an inert gas atmosphere (an Ar gas), it is possible to produce high-purity silicon whose nitrogen and oxygen content is very low. This will be the case also when the atmosphere of reduction reaction is a helium gas atmosphere. Note however that where the atmosphere is a nitrogen gas, nitrogen inevitably dissolves into the molten silicon, but it is possible to avoid contamination with oxygen. Moreover, the contamination of molten silicon with N and O does not have a significant influence on the specifications of a product Si plate when used as a semiconductor substrate.

Note that the refractory chamber 12 storing the material mixture powder is made of silica ($SiO_2$). Since silica allows microwave to pass therethrough, the material mixture powder can be efficiently irradiated with microwave. For example, if magnesia (MgO) is used as the chamber 12, the magnesia is reduced to produce an Mg gas, which reacts with $SiO_2$ to produce $MgSiO_2$ (forsterite). If alumina ($Al_2O_3$) is used as the chamber 12, mullite ($3Al_2O_3 \cdot 2SiO_2$) is produced. Then, the material $SiO_2$ is consumed for the production of mullite, thus lowering the yield of Si.

In order to prevent microwave from leaking out of the furnace, the water-cooled pipes 23 and 24 need to be sufficiently in contact with the iron furnace body 32. Since the water-cooled pipes 23 and 24 are arranged near the reaction chamber 12 and are exposed to a high temperature of 1300° C. to 1500° C., the tip of the iron pipes 23 and 24 is preferably water-cooled.

An SiO gas and a CO gas are generated from the reaction chamber 12. Since the SiO gas in the discharge gas maintains the inside of the reaction chamber 12 at around 1 atm, it is retrieved in the cyclone 27 as Si and $SiO_2$, and $SiO_2$ is recycled as the material. The CO gas in the discharge gas is then discharged out of the furnace through the water-cooled iron pipe 23. In this process, part of the unreacted material powder is scattered in the discharge gas, and it is therefore retrieved by the cyclone 27, or the like. The furnace body 32 of the microwave furnace needs to be produced by a structure material of iron, stainless steel, or the like, that does not allow microwave to pass therethrough, and it needs to be tightly closed so that microwave does not leak out. However, airtightness is not required.

For the microwave transmitting antenna 34, there are waveguide-type antennas and helical antennas. With a waveguide-type antenna, the energy will be uniform because microwave is reflected at the wall, or the like, but the microwave will attenuate each time it is reflected at the wall. When an object to be heated is set therein, the energy therearound is absorbed by the material, thus allowing many objects to be heated at once. Note however that even with a waveguide-type antenna only by angling the tip of the waveguide to incline the tip portion, it is possible to output microwave in that direction. On the other hand, a helical antenna has strong directionality, and by using a plurality of helical antennas, it is possible to increase the energy density over a limited area in the furnace, and it is possible to reduce the loss by the reflection at the wall.

Thus, by using a mixture powder 2 including a silicon oxide ($SiO_2$) powder and a graphite (C) powder or a mixture powder 2 including a silicon oxide ($SiO_2$) powder, a graphite (C) powder and a silicon carbide (SiC) powder as a material and graphite (C) as a heat generation source, it is possible, using microwave irradiation, to efficiently heat the material and allow for the reduction reaction.

Microwave is absorbed, in a localized manner, by the material (a graphite, silica and silicon carbide powder) in the reaction chamber 12, thereby rapidly increasing the temperature of the material. The reduction reaction proceeds quickly to produce molten silicon. A silica refractory material of the chamber 12 for holding the material does not absorb microwave, but since the melting point of silica is about 1600° C., the outside of the chamber 12 needs to be maintained at 1600° C. or lower and 1410° C. (the melting point of silicon) or higher. Therefore, for example, it is preferred to provide appropriate cooling, such as blowing the air. The temperature at which silicon is produced through reduction reaction is 1796° C. or higher. On the other hand, the melting point of silicon is 1412° C., and silicon produced through reduction reaction will have the production temperature (1796° C. or higher), and therefore it will be in a molten state and does not require auxiliary heating.

Note however that a heat-insulating material (a heat-insulating board, or the like) may be provided surrounding the reaction chamber 12. The heat-insulating material is preferably a material that in principle does not absorb microwave, i.e., a material that is not self-heated when irradiated with microwave. In practice, the heat-insulating material is preferably a material of which the amount of heat generated is about 20% or less of that generated by the reaction material of the same mass absorbing microwave, and of which the refractory temperature is 1400° C. or higher. Such materials include an alumina fiber blanket, and a refractory material such as silica or magnesia. A mullite heat-insulating board is preferably installed outside the furnace body 32.

Thus, in the present embodiment, in the process where the temperature increases from room temperature to a relatively low temperature, the temperature of the material mixture powder is increased by virtue of the self-heating of the graphite powder or the silicon carbide powder that easily absorbs microwave (absorbs about 90% of the output microwave), and a reaction between $SiO_2$ and SiC or C is positively allowed to occur after the material mixture powder has reached a high temperature. Therefore, it is possible to efficiently allow a reaction between $SiO_2$ and SiC or C to occur, to quickly allow the $SiO_2$ reduction reaction to occur, and to quickly obtain high-purity Si.

In this case, by the reduction reaction, the surface temperature of the material powder will be about 1800° C., and the temperature of the reaction chamber 12 about 1450° C., and about 60 minutes is sufficient for the reduction reaction in the reaction chamber 12. In the prior art, where silicon is obtained through reduction by heating silica mass and black lead mass to about 3000° C. using an arc furnace, radiation heat having a short wavelength (about 2 μm) generated by arcing, and the solid mass heating efficiency is therefore low, thus requiring a reaction time as long as about 8 hours. In contrast, according to the present invention, it is possible to produce high-purity silicon very quickly, continuously, and with industrial practicality.

Theoretically, the microwave output power needs to be 6.8 MWh for a daily production of 1 ton of silicon. Assuming that the energy efficiency of electric power is about 60%, an electric power of 11.3 MWh is required. This is equivalent to an output power of 476 kW.

According to the present invention, it is possible to produce high-purity silicon of about 6 N for use in photovoltaic generation. In order to achieve this, although there is little impurity to be mixed in during the process of producing molten silicon using microwave, a material needs to be of a high purity such that the phosphorus and boron content is about 0.3 ppm or less. When silicon is to be obtained by reduction through arc heating using a conventional arc furnace, it is difficult to tightly close the reaction chamber because of the use of electrodes, failing to prevent the SiO gas from dissipating, thereby resulting in a low silicon yield and failing to prevent impurities from being mixed in from the electrodes. Therefore, conventional methods convert coarse silicon produced by arc heating to a silane ($SiHCl_3$) gas by the Siemens method, and it is reduced with a hydrogen gas so as to produce silicon of 11 N for semiconductor applications. Thus, the production process is very time consuming. According to the present invention, it is possible to produce high-purity silicon of about 11 N without using the Siemens method by increasing the purity of the material powder.

Next, referring to FIGS. 3 to 5, a microwave reduction furnace according to another embodiment of the present invention will be described. FIG. 3 is a front cross-sectional view showing the microwave reduction furnace and the vicinity thereof, and FIG. 5 is a perspective view showing the entirety of the inside of the microwave reduction furnace. As shown in FIG. 5, microwave units 43 for outputting a plurality of microwave beams are arranged on the inner surface of a support plate 41 forming a circumferential surface centered about a melting furnace 50, and these microwave units 43 output microwave toward the center C of the container space of a reaction chamber 51a in the melting furnace 50. The inner surface of the support plate 41 is curved inwardly along the vertical section thereof, and the inner surface is located along the circumference centered about the melting furnace 50 as seen in a plan view. Thus, the support plate 41 is bulging outwardly as seen in an elevation view, with the inner surface being slightly curved inwardly of the support plate 41 with respect to the up-down direction. For example, the microwave unit 43 is a 10 kW high-directionality microwave source unit including semiconductor 500 W modules 42 arranged in a lattice pattern of 4 columns by 5 rows, and the microwave unit 43 forms a 10 kW wave source synthesis radial phased array antenna radiator. The power density of the microwave unit 43 is about that of an incandescent light bulb. A plurality of microwave units 43 are arranged in the circumferential direction in two (upper and lower) rows, on the inner surface of the cylindrical support plate 41, for example. Note that the number of the microwave units 43 is not limited to the number above. As an example, the microwave reduction furnace of the present embodiment has an overall height (including the melting furnace 50 to be described later) of, 3 to 4 m and a diameter of 8 m, and the size of the microwave unit 43 is about 20 cm vertically and about 25 cm horizontally.

The melting furnace 50 includes the reaction furnace 51 arranged at the center thereof, as shown in FIG. 3, and a material supply pipe 61 is arranged at the center of a main reflection mirror 53 (to be described later), which forms the top plate of the melting furnace 50. Then, a mixture powder 2 including a silicon oxide ($SiO_2$) powder and a graphite (C) powder or a mixture powder 2 including a silicon oxide ($SiO_2$) powder, a graphite (C) powder and a silicon carbide (SiC) powder is supplied continuously into the container space of the reaction furnace 51 through the material supply pipe 61. The material mixture powder 2 is irradiated with microwave to be heated and melt, thus undergoing a reduction reaction, thereby producing the molten silicon 3. The reaction furnace 51 includes a pot-shaped reaction chamber 51a having a container space for the material powder, and a heat-insulating material 51b of porous alumina, or the like, for supporting the outer surface of the reaction chamber 51a and for providing heat insulation, and a furnace body 59 made of stainless steel or iron further covering the outer surface (the side surface and the bottom surface) of the heat-insulating material 51b. A heat-insulating material 52 of porous alumina, or the like, is further provided outside the reaction furnace 51, with the upper surface of the heat-insulating material 52 being sloped downward toward the outside.

The reaction chamber 51a is made of silica or silicon carbide, and is provided in the melting furnace 50 while being supported by the heat-insulating material 51b as if it were lining the inner surface of the heat-insulating material 51b. The bottom surface of the reaction chamber 51a is mildly curved so as to slightly protrude downwards, with the peripheral edge portion of the bottom surface being positioned higher than the center of the bottom surface. A molten silicon tapping hole 62 is provided at the boundary between the bottom surface and the side surface of the reaction chamber 51a. Provided in the tapping hole 62 is a tapping pipe 63 made of silica extending in a downwardly slanted direction toward the outside so as to be communicating with the container space in the reaction chamber 51a. A heater 64, such as a resistance heating coil, is provided so as to be fitted around the tapping pipe 63, and the heater 64 increases and keeps the temperature of the molten silicon flowing through the tapping pipe 63.

A weir 65 is provided on a portion of the tapping hole 62 inside the reaction chamber 51a, extending from the side surface of the reaction chamber 51a and bending down so that the lower end thereof is immersed in the molten silicon 3. The molten silicon 3 flows out toward the tapping pipe 63 through the gap between the lower end of the weir 65 and the bottom surface of the reaction chamber 51a to be discharged outside through the tapping pipe 63. In this process, the molten silicon 3 flows out of the bottom portion of the reaction chamber 51a by virtue of a siphon action.

A cylindrical microwave window 54 is provided standing up along the outer circumference of the heat-insulating material 52 around the peripheral edge portion of the reaction furnace 51, and the main reflection mirror 53 is provided above the reaction furnace 51 so as to cover the area above the microwave window 54. The main reflection mirror 53 has a paraboloid that forms a parabola along a vertical section thereof, and microwave that is reflected by the inner surface forming the paraboloid converges at the center C, which coincides with the focal point of the paraboloid.

The main reflection mirror 53 is made of a metal that reflects microwave beams. For example, it may be copper or copper alloy, gold-plated stainless steel, ceramics coated with a conductive film, or the like. As the reflection surface of the main reflection mirror 53 is formed by copper or copper alloy, gold, or a conductive film, it can reflect microwave beams. The microwave window 54 is made of a glass that allows microwave beams to pass therethrough, and may be, for example, Neoceram (registered trademark) having a small thermal expansion.

The main reflection mirror 53 includes a stepped reflection surface 55, as shown in FIG. 4, provided in a partial area 53a thereof. FIG. 4 is an enlarged view showing the point A of FIG. 3. The stepped reflection surface 55 is obtained by forming a portion of the paraboloid in a stepped configuration, and the width D in the circumferential direction of the paraboloid is 5 to 50 times the wavelength of infrared rays. Thus, infrared rays radiated from the reaction chamber 51 and the material are reflected by the stepped reflection surface 55 and return to the material in the reaction chamber 51. The stepped reflection surface 55 is a series of minute surfaces connected together each having the width D, which is 5 to 50 times the infrared wavelength, as described above, and has a property of reflecting infrared rays and visible light. Then, the inclination angle, and the like, of the stepped reflection surface 55 are designed so that infrared rays radiated from the surface of the molten contained material and infrared rays radiated from the surface of the reaction chamber 51 are reflected by the stepped reflection surface 55 so as to return to the contained material. Thus, infrared rays radiated from the reaction chamber 51 and the contained material can be confined between the main reflection surface 53 and the reaction chamber 51. Note that microwave has a long wavelength and is therefore not influenced by the stepped reflection surface 55. That is, microwave beams are reflected by the paraboloid of the main reflection mirror 53 toward the focal position of the paraboloid, without being influenced by the steps. Therefore, even if the stepped reflection surface 55 is provided across the entire surface of the main reflection mirror 53, it will not inhibit reflection of the microwave beams. Infrared rays can be reflected efficiently by providing the stepped reflection surface 55 on the inner surface of the main reflection mirror 53 at least over an area where infrared rays radiated from the contained material and the reaction chamber 51 arrive (e.g., at least over an area directly above the contained material), as shown in FIG. 3. Note that the stepped reflection surface 55 may be a flat surface, or may be curved to about the same degree as the main reflection surface 53.

The microwave window 54 is made of a material that allows microwave to pass therethrough, and guides microwave beams radiated from the microwave units 43 into the melting furnace 50. While the melting furnace 50 has a space surrounded by the reaction chamber 51, the main reflection mirror 53 and the microwave window 54, the atmosphere inside this space may be an Ar gas atmosphere or the ambient atmosphere.

A sub-reflection mirror 56 is formed on the slope of the upper surface of the heat-insulating material 52 along the peripheral edge portion of the reaction furnace 51 for reflecting microwave beams, which have been introduced from the outside through the microwave window 54, toward the main reflection mirror 53. The microwave beams reflected by the sub-reflection mirror 56 are then reflected by the main reflection mirror 53 to converge at the center C inside the reaction chamber 51.

Moreover, a slope downwardly inclined toward the inside is formed on the upper surface along the peripheral edge portion of the heat-insulating material 51b of the reaction furnace 51, and an auxiliary reflection mirror 57 is provided on this slope for reflecting infrared rays and visible light rays radiated from the reaction chamber 51a and the surface of the material mixture powder 2 toward the main reflection mirror 53. The infrared rays and visible light rays reflected by the auxiliary reflection mirror 57 are then reflected by the main reflection mirror 53 to converge toward the material mixture powder 2 and the molten silicon 3 in the reaction chamber 51a.

A gas discharge port 58 for discharging the gas in the furnace (an upper space of the reaction chamber 51a) is provided along the peripheral edge portion of the heat-insulating material 51b of the reaction furnace 51. A gas supply section 60 for supplying an inert gas such as an argon gas, a helium gas, a nitrogen gas, or the like, into the furnace (an upper space of the reaction chamber 51a) is provided in a portion of the heat-insulating material 52 outside the reaction furnace 51.

Next, an operation of a method for producing silicon using a microwave reduction furnace configured as described above will be described. A mixture powder 2 including a silicon oxide ($SiO_2$) powder and a graphite (C) powder or a mixture powder 2 including a silicon oxide ($SiO_2$) powder, a graphite (C) powder and a silicon carbide (SiC) powder is continuously introduced into the container space of the reaction chamber 51a through the material supply pipe 61, and the inside of the melting furnace 50 is set to an Ar gas atmosphere, after which microwave beams are output from the microwave units 43 toward the melting furnace 50. The microwave beams travel from the cylindrical support plate 41 toward the reaction chamber 51a of the melting furnace 50 arranged at the cylindrical center of the support plate 41, while increasing the power density. In the present embodiment, the microwave units 43 are arranged so that the output beams are directed toward the cylindrical center of the support plate 41, while the inner surface of the support plate 41 is curved with respect to the vertical direction. Therefore, microwave beams output from the microwave units 43 are aimed, not only horizontally but also vertically, at the reaction chamber 51a arranged at the center of the support plate 41. Thus, the power density of the microwave beams can be significantly increased in the vicinity of the reaction chamber 51a. Note that the support plate 41 does not need to be extending in the circumferential direction or be bulging with respect to the vertical direction, and the power density of the microwave beams can be increased as long as the microwave units 43 are arranged so that the output microwave beams thereof are directed toward the reaction chamber 51a.

Then, the microwave beams whose power density has increased are introduced into the melting furnace 50 through the microwave window 54 of the melting furnace 50, are reflected by the sub-reflection mirror 56 toward the main reflection mirror 53, and then are reflected by the main reflection mirror 53 toward the contained material in the container space of the reaction chamber 51a. Since the main reflection mirror 53 has a paraboloid, the microwave beams converge at the focal position (the center C) of the paraboloid. Thus, over the range from room temperature to a relatively low temperature, the graphite powder in the mixture material absorbs the microwave to be heated, thereby increasing the temperature. Then, the mixture powder 2 including a silicon oxide ($SiO_2$) powder and a graphite (C) powder or the mixture powder 2 including a silicon oxide ($SiO_2$) powder, a graphite (C) powder and a silicon carbide (SiC) powder is heated by the graphite powder, thereby causing a reduction reaction of the silicon oxide powder, producing the molten silicon 3. The molten silicon 3 is once stored in the bottom portion of the reaction chamber 51a and flows out via the tapping hole 62 through the tapping pipe 63.

While infrared rays are radiated from the material powder 2 or the reaction chamber 51a, the infrared rays are reflected by the stepped reflection surface 55 provided over a portion of the main reflection mirror 53 so as to return to the material powder 2 or the molten silicon 3. The microwave beams irradiating the contained material, such as the molten silicon, are reflected by the contained material toward the main reflection mirror 53, and then are reflected by the main reflection mirror 53 so as to return to the contained material. Thus, microwave beams and infrared rays are confined within the space around the contained material in the reaction chamber 51, thereby efficiently heating the contained material. Therefore, it is possible to efficiently reduce silica (silica ore) to obtain high-purity silicon. With a microwave heating furnace sized as described above, it is possible to produce 1 ton of molten silicon per day.

The present embodiment also enables efficient production of high-purity silicon. In the prior art, silicon substrates for solar cells have been produced using an electric furnace, and the production required a large amount of time. However, by producing high-purity silicon by efficiently allowing for a reduction reaction through heating using a microwave reduction furnace of the present embodiment, it is possible to produce silicon substrates without the smelting process using silane as required in the conventional Siemens method, thus conserving the input energy accordingly.

INDUSTRIAL APPLICABILITY

According to the present invention, graphite is self-heated by absorbing microwave over a heating range from room temperature to a relatively low temperature, thereby increasing the temperature of the mixture powder material, after which over a relatively high temperature range, the material is heated and melted while a reduction reaction is allowed to occur of a mixture powder 2 including a silicon oxide ($SiO_2$) powder and a graphite (C) powder or a mixture powder 2 including a silicon oxide ($SiO_2$) powder, a graphite (C) powder and a silicon carbide (SiC) powder, thereby producing high-purity silicon. Thus, it is possible to produce high-purity silicon with a very high efficiency, quickly and at low cost. Therefore, the present invention can make a significant contribution to providing a low-cost supply of high-purity silicon for use in solar cells and semiconductor substrates.

REFERENCE SIGNS LIST

Figure 1:
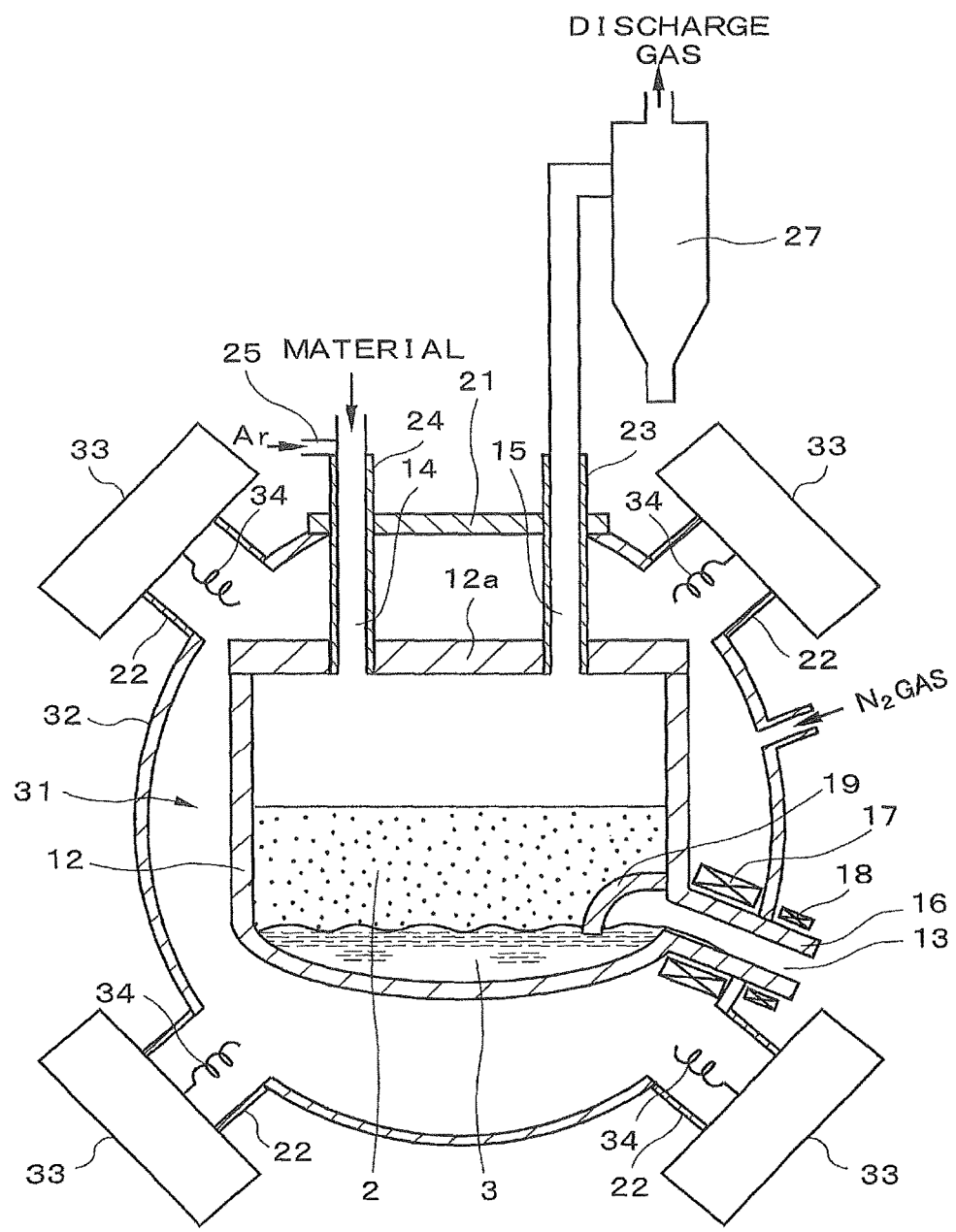
FIG. 1 A vertical-sectional view showing a microwave reduction furnace for use with a method for producing silicon using microwave according to an embodiment of the present invention.
Figure 2:
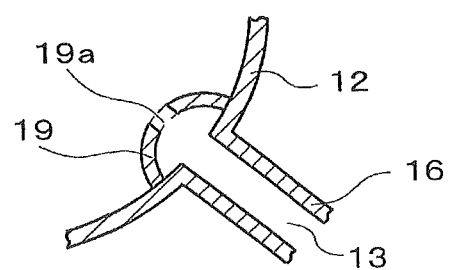
FIG. 2 A partial plan view showing a weir portion thereof.
Figure 3:
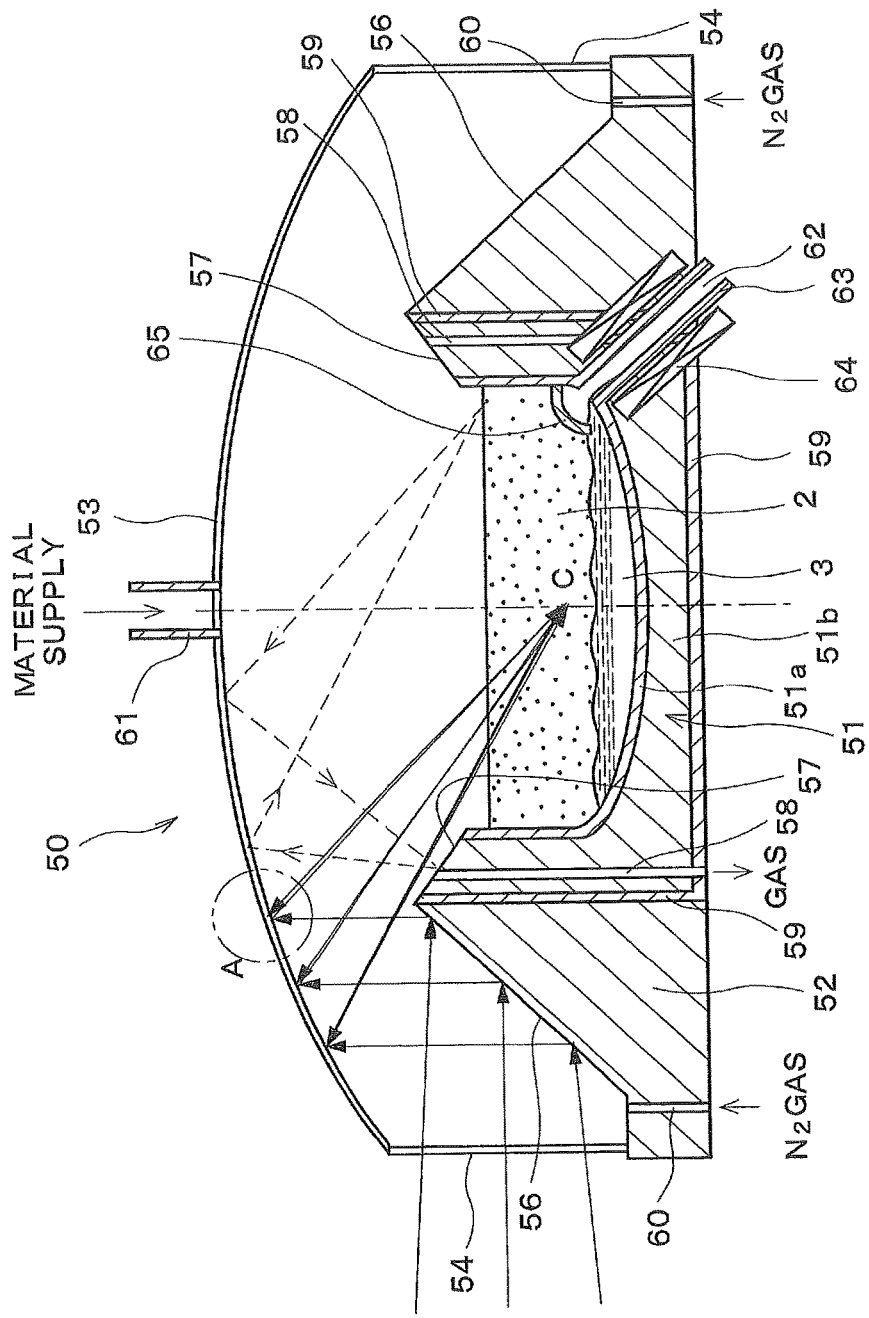
FIG. 3 A vertical-sectional view showing a melting furnace of a microwave reduction furnace according to another embodiment of the present invention.
Figure 4:
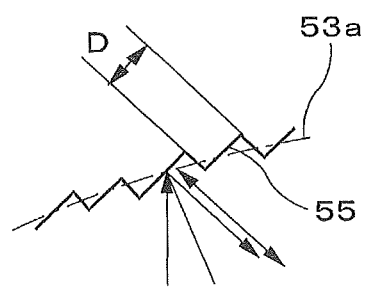
FIG. 4 A diagram showing a stepped reflection mirror thereof.
Figure 5:
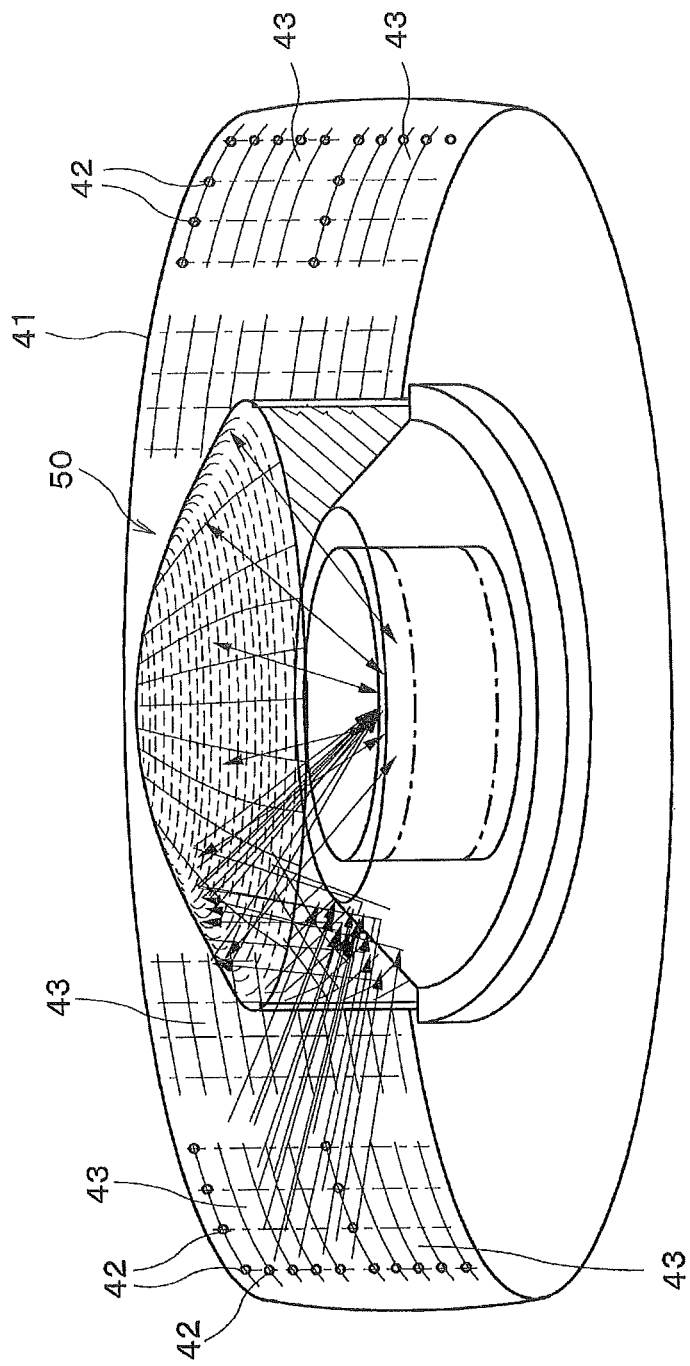
FIG. 5 A perspective view showing the entire microwave reduction furnace.

2: Material mixture powder ($SiO_2$+SiC+C or $SiO_2$+C)
3: Molten silicon
12, 51a: Silica reaction chamber
13, 62: Tapping hole
16, 63: Tapping pipe
17, 18, 64: Heater
31: Reaction furnace
32: Furnace body
33: Microwave oscillator
34: Microwave transmitting antenna
41: Support plate
42: Semiconductor 500 W module
43: Microwave unit
50: Melting furnace
51: Reaction furnace
51b, 52: Heat-insulating material
53: Main reflection mirror
53a: Microwave mirror surface
54: Microwave window
55: Stepped reflection surface
56: Sub-reflection mirror
57: Auxiliary reflection mirror

The invention claimed is:

1. A microwave reduction furnace comprising:
a reaction furnace provided with a refractory chamber of silica or silicon carbide for storing a material therein;
a supply section for supplying the material into the refractory chamber, the material being a mixture of a silica powder and a graphite powder or a mixture of a silica powder, a silicon carbide powder and a graphite powder;
a discharge section for discharging molten silicon, obtained through reduction reaction, out of the chamber, said discharge section having a tapping hole, provided at the chamber, through which the molten silicon flows and a weir whose tip is configured to be immersed in the molten silicon to prevent an SiO gas produced in the chamber from leaking out of the chamber; and
a microwave oscillator for outputting a microwave toward the refractory chamber in the reaction furnace with a degree of directionality by virtue of a helical antenna or a waveguide.

2. The microwave reduction furnace according to claim 1, wherein the weir includes a cutout at a position along a center line of a tapping pipe that includes the tapping hole, and
wherein the cutout serves as a molten silicon outlet with a remaining portion other than an outlet serving to block an outflow of the molten silicon.

3. The microwave reduction furnace according to claim 2, wherein the weir extends from a side wall inner surface of the chamber and bends toward a bottom surface of the chamber.

4. The microwave reduction furnace according to claim 3, wherein the weir includes a drooping end, and wherein at the drooping end of the weir, opposing side portions of the weir beside the outlet are in contact with the bottom surface of the chamber and supported by the bottom surface, with the portion of the weir corresponding to the outlet being positioned so as to be immersed in the molten silicon as the molten silicon fills a bottom portion of the chamber.

5. The microwave reduction furnace according to claim 1, wherein the mixture material consists essentially of the silica powder, the silicon carbide powder and the graphite powder.

6. The microwave reduction furnace according to claim 1, wherein the mixture material consists essentially of the silica powder and the graphite powder.

7. The microwave reduction furnace according to claim 1, wherein the mixture material consists of the silica powder, the silicon carbide powder and the graphite powder.

8. The microwave reduction furnace according to claim 1, wherein the mixture material consists of the silica powder and the graphite powder.

9. The microwave reduction furnace according to claim 1, wherein the mixture material comprises the silica powder, the silicon carbide powder and the graphite powder.

10. The microwave reduction furnace according to claim 1, wherein the mixture material comprises the silica powder and the graphite powder.

11. The microwave reduction furnace according to claim 1, wherein the weir comprises a refractory material and is provided on a portion of the tapping hole.

12. The microwave reduction furnace according to claim 1, wherein the weir includes an outlet with an upper end of the outlet of the weir immersed in the molten silicon when the molten silicon starts flowing out continuously by a siphon-action.

13. The microwave reduction furnace according to claim 12, where immersion of the upper end of the outlet of the weir in the molten silicon prevents the SiO gas in the chamber from leaking out through the outlet.

14. The microwave reduction furnace according to claim 1, wherein the tip of the weir is out of contact with a bottom surface of the chamber.

15. A microwave reduction furnace comprising:
a reaction furnace provided with a refractory chamber of silica or silicon carbide, the reaction furnace being capable of storing a material therein and preventing a generated gas from escaping;
a supply section for supplying the material into the refractory chamber, the material being a mixture of a silica powder and a graphite powder or a mixture of the silica powder, a silicon carbide powder and the graphite powder;
a discharge section for discharging molten silicon, obtained through reduction reaction, out of the chamber, said discharge section having a tapping hole, provided at the chamber, through which the molten silicon flows and a weir whose tip is configured to be immersed in the molten silicon to prevent an SiO gas produced in the chamber from leaking out of the chamber; and
a microwave oscillator for outputting a microwave toward the refractory chamber in the reaction furnace with a degree of directionality by virtue of a helical antenna or a waveguide,
wherein the SiO gas is produced as an intermediate product through the reduction reaction between the silica powder and the silicon carbide powder and/or the graphite powder, and the SiO gas is allowed to be in contact with the silica, graphite and/or silicon carbide powders while preventing the SiO gas from escaping out of the refractory chamber, thus reducing the silica powder through the reduction reaction, thereby allowing for continuous production of the molten silicon.

16. A microwave reduction furnace comprising:
a reaction furnace provided with a refractory chamber of silica or silicon carbide for storing a material therein;
a supply section for supplying the material into the chamber, the material being a mixture of a silica powder and a graphite powder or a mixture of a silica powder, a silicon carbide powder and a graphite powder;
a discharge section for discharging molten silicon, obtained through reduction reaction, out of the chamber, said discharge section having a tapping hole, provided at the chamber, through which the molten silicon flows and a weir whose tip is configured to be immersed in the molten silicon to prevent an SiO gas produced in the chamber from leaking out of the chamber; and
a microwave unit arranged on an inner surface of a circumferential surface surrounding the refractory chamber for radiating a microwave beam toward a particular point in the refractory chamber; and
a main reflection mirror arranged above the refractory chamber, the main reflection mirror having a paraboloid whose focal point coincides with the particular point and which paraboloid serves as a reflection surface for a microwave.

17. A microwave reduction furnace comprising:
a reaction furnace provided with a refractory chamber of silica or silicon carbide for storing a material therein;
a microwave window surrounding the reaction furnace;
a melting furnace top plate supported by the microwave window for covering the refractory chamber so as to prevent a generated gas from escaping;
a supply section for supplying the material into the refractory chamber through the melting furnace top plate, the material being a mixture of a silica powder and a graphite powder or a mixture of the silica powder, a silicon carbide powder and the graphite powder;
a discharge section for discharging molten silicon, obtained through reduction reaction, out of the chamber, said discharge section having a tapping hole, provided at the chamber, through which the molten silicon flows and a weir whose tip is configured to be immersed in the molten silicon to prevent an SiO gas produced in the chamber from leaking out of the chamber;
a microwave unit arranged on an inner surface of a circumferential surface surrounding the refractory chamber for radiating a microwave beam toward a particular point in the refractory chamber; and
a main reflection mirror arranged above the refractory chamber, the main reflection mirror having a paraboloid whose focal point coincides with the particular point and which paraboloid serves as a reflection surface for a microwave,
wherein the SiO gas is produced as an intermediate product through the reduction reaction between the silica powder and the silicon carbide powder and/or the graphite powder, and the SiO gas is allowed to be in contact with the silica powder, graphite powder and/or silicon carbide powder while preventing the SiO gas from escaping out of a housing constructed by the refractory chamber and the melting furnace top plate, thus reducing the silica powder through the reduction reaction, thereby allowing for continuous production of the molten silicon.

* * * * *